United States Patent
Jumonji et al.

(10) Patent No.: US 12,347,087 B2
(45) Date of Patent: Jul. 1, 2025

(54) DETERIORATION DIAGNOSIS DEVICE, DETERIORATION DIAGNOSIS METHOD, AND RECORDING MEDIUM

(71) Applicant: NEC Corporation, Tokyo (JP)

(72) Inventors: Nana Jumonji, Tokyo (JP); Maiko Hasegawa, Tokyo (JP); Yosuke Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 46 days.

(21) Appl. No.: 17/909,811

(22) PCT Filed: Mar. 8, 2021

(86) PCT No.: PCT/JP2021/009039
§ 371 (c)(1),
(2) Date: Sep. 7, 2022

(87) PCT Pub. No.: WO2021/199942
PCT Pub. Date: Oct. 7, 2021

(65) Prior Publication Data
US 2024/0212116 A1    Jun. 27, 2024

(30) Foreign Application Priority Data
Mar. 31, 2020 (JP) .................. 2020-062915

(51) Int. Cl.
*G06T 7/00* (2017.01)
*G01B 11/30* (2006.01)
*G06Q 50/08* (2012.01)

(52) U.S. Cl.
CPC ............ *G06T 7/0002* (2013.01); *G01B 11/30* (2013.01); *G06Q 50/08* (2013.01);
(Continued)

(58) Field of Classification Search
CPC ...... G01N 2291/044; G01N 2291/0258; G06T 2207/30184; G06T 7/0002; G06Q 50/08; G01B 11/30
See application file for complete search history.

(56) References Cited

U.S. PATENT DOCUMENTS

2017/0161628 A1    6/2017    Chiba et al.

FOREIGN PATENT DOCUMENTS

| JP | 2001-108102 A | 4/2001 |
| JP | 2009-192221 A | 8/2009 |

(Continued)

OTHER PUBLICATIONS

Computer English translation of Japanese Patent No. JP 2007-140608 A. (Year: 2007).*

(Continued)

*Primary Examiner* — Daniel G Mariam

(57) ABSTRACT

A deterioration diagnosis device according to the present invention includes: a memory; and at least one processor coupled to the memory. The processor performs operations. The operations include: storing a history of deterioration degree in a portion to be diagnosed in a structure; calculating a deterioration speed of the portion based on the history; acquiring reference information to be used to calculate an inspection frequency; calculating an inspection frequency for the portion based on the reference information and the deterioration speed; and outputting the calculated frequency.

10 Claims, 15 Drawing Sheets

(52) U.S. Cl.
CPC .............. *G01N 2291/0258* (2013.01); *G01N 2291/044* (2013.01); *G06T 2207/30184* (2013.01)

(56) References Cited

FOREIGN PATENT DOCUMENTS

| | | |
|---|---|---|
| JP | 2009-244061 A | 10/2009 |
| JP | 2019-057192 A | 4/2019 |
| JP | 2019-183527 A | 10/2019 |
| WO | 2015/166637 A1 | 11/2015 |
| WO | 2016/132587 A1 | 8/2016 |

OTHER PUBLICATIONS

Computer English translation of Japanese patent Np. JP 2019-57192 A (Year: 2019).*
Computer English Translation of Japanese Patent No. JP-H11-132961 (Year: 1999).*
Computer English Translation of Japanese Patent No. JP 2020-20194 (Year: 2020).*
JP Office Action for JP Application No. 2023-132408, mailed on Apr. 16, 2024 with English Translation.
International Search Report for PCT Application No. PCT/JP2021/009039, mailed on May 18, 2021.
English translation of Written opinion for PCT Application No. PCT/JP2021/009039, mailed on May 18, 2021.

* cited by examiner

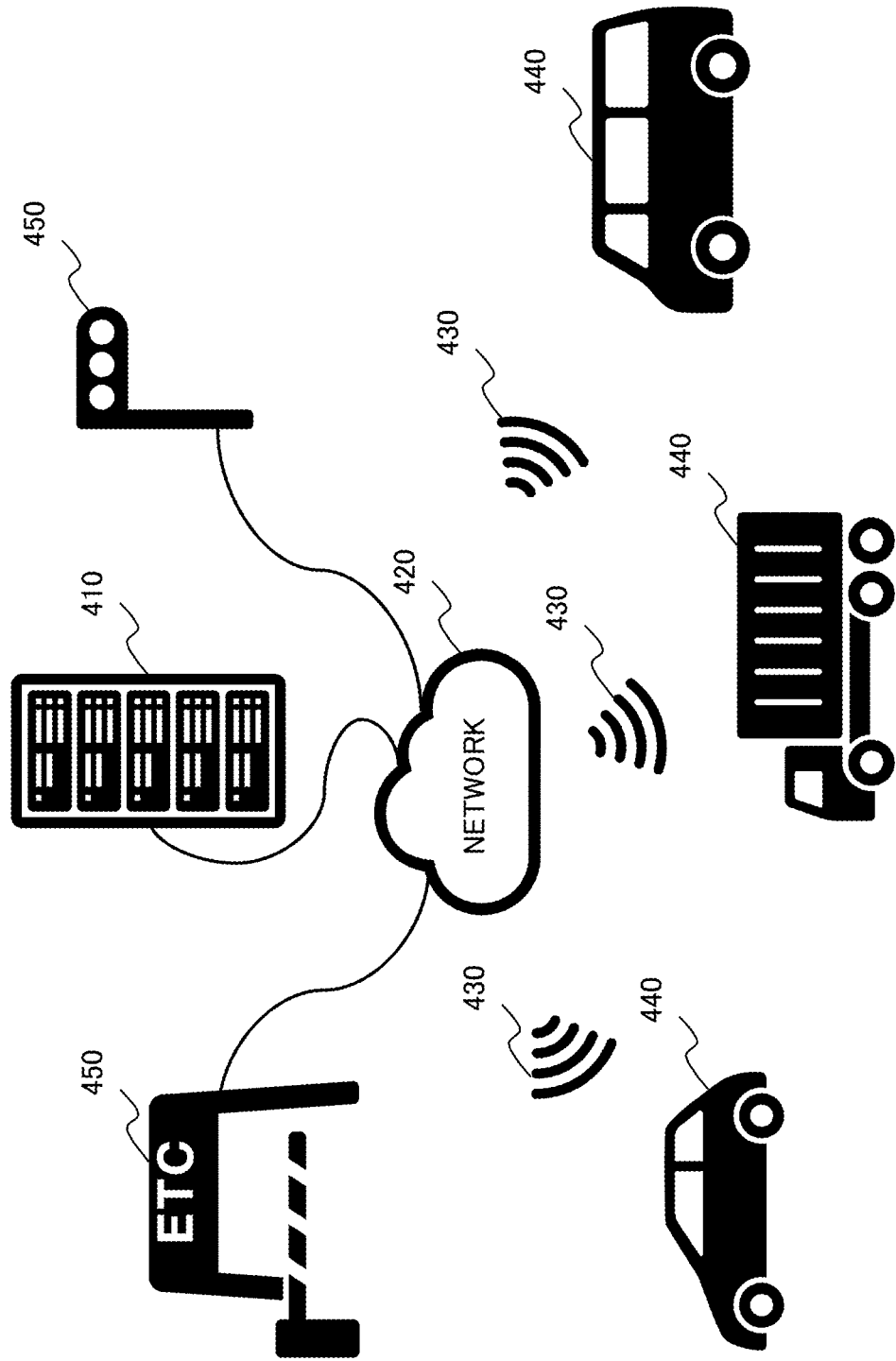

DETERIORATION DIAGNOSIS DEVICE, DETERIORATION DIAGNOSIS METHOD, AND RECORDING MEDIUM

This application is a National Stage Entry of PCT/JP2021/009039 filed on Mar. 8, 2021, which claims priority from Japanese Patent Application 2020-062915 filed on Mar. 31, 2020, the contents of all of which are incorporated herein by reference, in their entirety.

TECHNICAL FIELD

The present invention relates to diagnosis of deterioration in a structure such as a road surface.

BACKGROUND ART

Structures such as a road surface of a road, a sign installed on a roadside, and a ceiling and a side wall such as a tunnel deteriorate over time.

Therefore, the manager of the structure periodically performs inspection in order to diagnose deterioration in the structure.

Therefore, a system for efficiently inspecting a structure has been proposed (see, for example, PTL 1).

The structure inspection support system described in PTL 1 visualizes a deterioration state based on analysis data including a deterioration in a structure, and generates an inspection repair plan. Further, the structure inspection support system described in PTL 1 displays a deterioration state at a time point selected by the user.

CITATION LIST

Patent Literature

[PTL 1] JP 2019-057192 A

SUMMARY OF INVENTION

Technical Problem

In general inspection of a road, the inspection frequency is uniformly set according to the classification of the road (for example, major arterial roads, auxiliary arterial roads, and other roads) and the like.

However, even if the roads are classified into the same type, the traffic volume on the road, the type of vehicles using the road, and the like are different. In addition, an environment such as a weather condition is different for each place. That is, even in the case of roads classified into the same type, the progress of deterioration differs for each road and each place.

Therefore, the inspection at a frequency that is uniformly set may not be an appropriate frequency for the deterioration of the road.

Therefore, it is desired to provide an appropriate inspection frequency for each portion of the road to be inspected.

PTL 1 discloses generation of an inspection plan and priority. However, the technique described in PTL 1 does not disclose calculating an inspection frequency.

As described above, the technique described in PTL 1 has an issue in that it is not possible to provide an inspection frequency for a portion to be subjected to deterioration diagnosis.

An object of the present invention is to solve the above issues and provide a deterioration diagnosis device or the like that provides an inspection frequency for deterioration diagnosis in a portion to be subjected to deterioration diagnosis.

Solution to Problem

A deterioration diagnosis device according to an example aspect of the present invention includes:
  a memory; and
  at least one processor coupled to the memory.
  The processor performs operations. The operations include:
    storing a history of deterioration degree in a portion to be diagnosed in a structure;
    calculating a deterioration speed of the portion based on the history;
    acquiring reference information to be used to calculate an inspection frequency;
    calculating the inspection frequency for the portion based on the reference information and the deterioration speed; and
    outputting the calculated frequency.

A deterioration diagnosis system according to an example aspect of the present invention includes:
  the deterioration diagnosis device described above;
  a reference information providing device that provides reference information; and
  a display device that receives a frequency output from the deterioration diagnosis device and displays the frequency.

A deterioration diagnosis method according to an example aspect of the present invention includes:
  storing a history of deterioration degree in a portion to be diagnosed in a structure;
  calculating a deterioration speed of the portion based on the history;
  acquiring reference information to be used to calculate an inspection frequency;
  calculating the inspection frequency for the portion based on the reference information and the deterioration speed; and
  outputting the calculated frequency.

A non-transitory computer-readable recording medium according to an example aspect of the present invention embodies a program. The program causes a computer to perform a method. The method includes:
  storing a history of deterioration degree in a portion to be diagnosed in a structure;
  calculating a deterioration speed of the portion based on the history;
  acquiring reference information to be used to calculate an inspection frequency;
  calculating the inspection frequency for the portion based on the reference information and the deterioration speed; and
  outputting the calculated frequency.

Advantageous Effects of Invention

According to the present invention, it is possible to achieve the effect of providing an inspection frequency for a portion to be subjected to deterioration diagnosis.

BRIEF DESCRIPTION OF DRAWINGS

FIG. 14 is a diagram for explaining the deterioration degree related to repair or the like.

FIG. 15 is a diagram illustrating an outline of ITS.

EXAMPLE EMBODIMENTS

Figure 1:
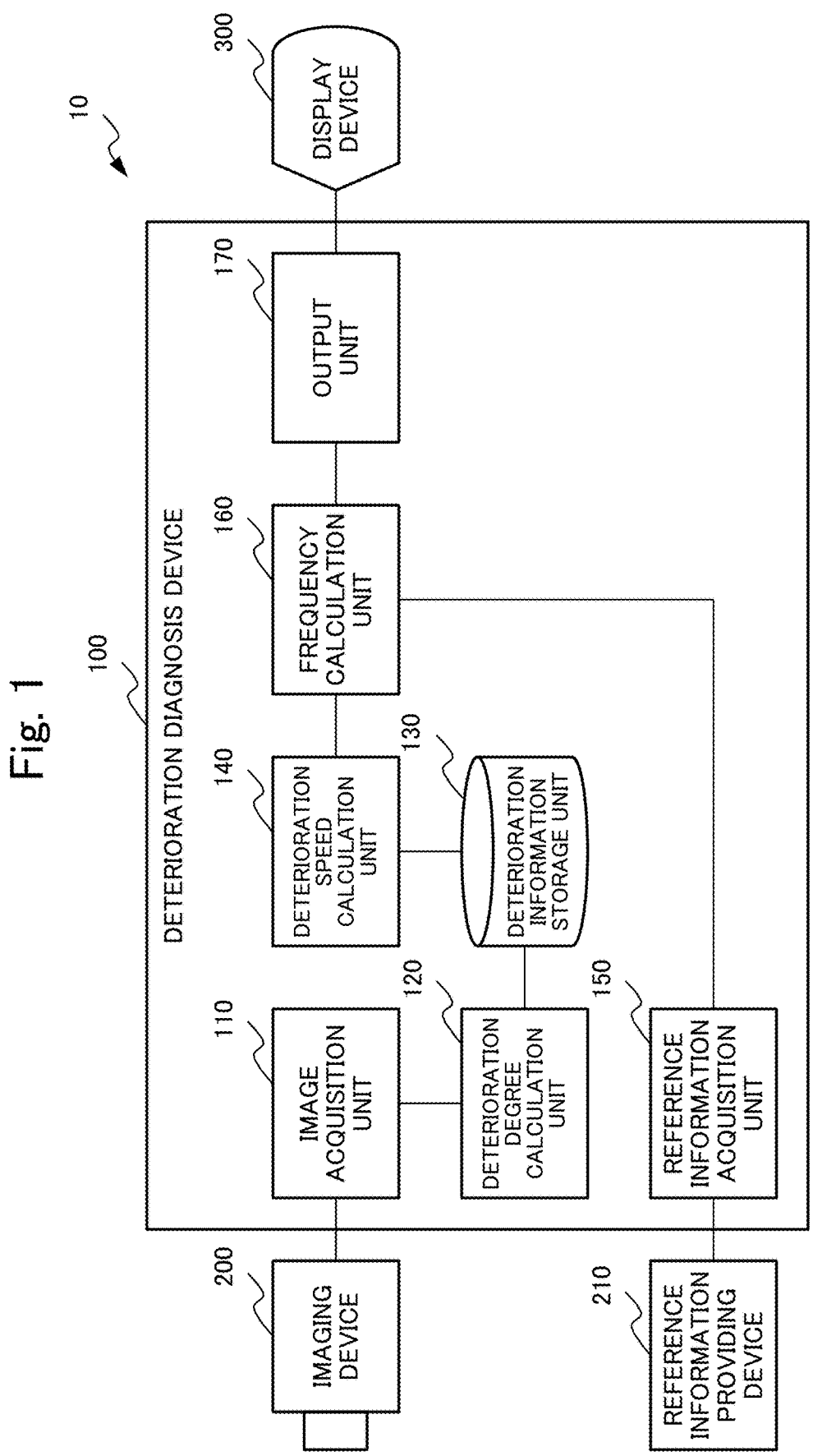
FIG. 1 is a block diagram illustrating an example of a configuration of a deterioration diagnosis system including a deterioration diagnosis device according to a first example embodiment.

Next, example embodiments of the present invention will be described with reference to the drawings.

The drawings are for describing example embodiments of the present invention. However, the present invention is not limited to the description of each drawing. In addition, similar configurations in each of the drawings are denoted by the same reference signs, and repeated description of these may be omitted. In addition, in the drawings used in the following description, the description of parts not related to the description of the present invention may be omitted and not illustrated.

Terms

First, terms in the description of each example embodiment will be described.

The "deterioration degree" is a result (for example, the level of deterioration) of deterioration diagnosis for a portion to be diagnosed in a structure.

The expression form of "deterioration degree" is optional. For example, a numerical value may be used for expressing the deterioration degree. Alternatively, a value other than a numerical value may be used for expressing the deterioration degree. For example, characters such as {SMALL, MEDIUM, LARGE} may be used for expressing the deterioration degree.

In each example embodiment, a predetermined analysis method is applied to an image including a portion to be diagnosed in a structure to calculate a deterioration degree in each portion. A target structure of each example embodiment is optional. For example, the structure may be a structure in social infrastructure such as a road (for example, a road surface, a sign, and a ceiling and a side wall of a tunnel or the like), a railway, a harbor, a dam, and a communication facility. Alternatively, the structure may be a structure in a life-related social capital such as a school, a hospital, a park, and a social welfare facility.

Alternatively, each example embodiment may calculate the deterioration degree by using information other than the image. For example, each example embodiment may calculate the deterioration degree by using acceleration detected using an acceleration sensor or the like. In each example embodiment, the deterioration degree may be calculated not for each portion but for the entire structure.

The value range of the deterioration degree is optional.

For example, each example embodiment may use a crack rate of a road surface for expressing the deterioration degree. In this case, the value of the deterioration degree is in the range of 0.0 to 1.0 (0% to 100%).

Alternatively, each example embodiment may use a rutting amount for expressing the deterioration degree. In this case, the value of the deterioration degree is generally an integer of 0 or more (the unit is mm). A rational number may be used as the value of the rutting amount.

Alternatively, in each example embodiment, an International Roughness Index (IRI) may be used for expressing the deterioration degree. In this case, the value of the deterioration degree is generally an integer of 0 or more (the unit is mm/m).

Alternatively, in each example embodiment, Maintenance Control Index (MCI) may be used for expressing the deterioration degree. The MCI is a composite deterioration index that can be obtained from a cracking rate, a rutting amount, and flatness.

As described, the value range of the deterioration degree is optional. The user of each example embodiment may appropriately select the expression of deterioration degree in relation to each deterioration in a structure to be repaired.

In the following description, a crack rate will be used as an example of expressing the deterioration degree. Therefore, in the following description, the value of the deterioration degree increases as the condition is worse. However, as the value of the deterioration degree, a smaller numerical value may be used as the condition is worse in relation to processing using the deterioration degree.

The "deterioration speed" is an extent of change in the deterioration degree with respect to time.

In each example embodiment, the deterioration speed may be temporally constant or may change. The user can select the type of expressing the deterioration speed according to the diagnosis target.

For example, linear approximation such as linear regression may be used for expressing the deterioration speed. Alternatively, a quadratic curve (quadratic regression) may be used for expressing the deterioration speed.

In the following description, the deterioration speed is assumed to be constant for convenience of explanation.

Further, each example embodiment may use the deterioration degrees associated with a plurality of deteriorations. For example, each example embodiment may use a crack rate and a rutting amount for expressing the deterioration. In this case, in each example embodiment, the frequency may be calculated by combining the deterioration degree and the deterioration speed in relation to each deterioration. In the following description, a case where one deterioration is used will be described for clarity of description.

The "reference information" is information used to calculate the inspection frequency.

The reference information is information determined according to a method of calculating the frequency.

For example, in a case where the inspection frequency is determined in relation to the amount of change in the deterioration degree, the reference information includes an amount of change in the deterioration degree.

Alternatively, if the inspection frequency is determined based on the number of inspections, the reference information includes the number of inspections.

The reference information may include other information (for example, information to be used to calculate the next inspection time).

For example, the reference information may include deterioration degree (hereinafter, referred to as "repair deterioration degree") that requires repair.

Alternatively, the reference information may include the following information.

The portion to be subjected to deterioration diagnosis is least deteriorated at the time of new installation. That is, the deterioration degree at the time of new installation is the lowest. The deterioration progresses with time. Therefore, the deterioration degree increases with time.

However, when repair, mending, or update or the like is performed, the deterioration state is improved. That is, the deterioration degree is lowered. Then, similarly to the state after the new installation, the deterioration progresses with time after repair, mending, or update or the like.

Figure 14:
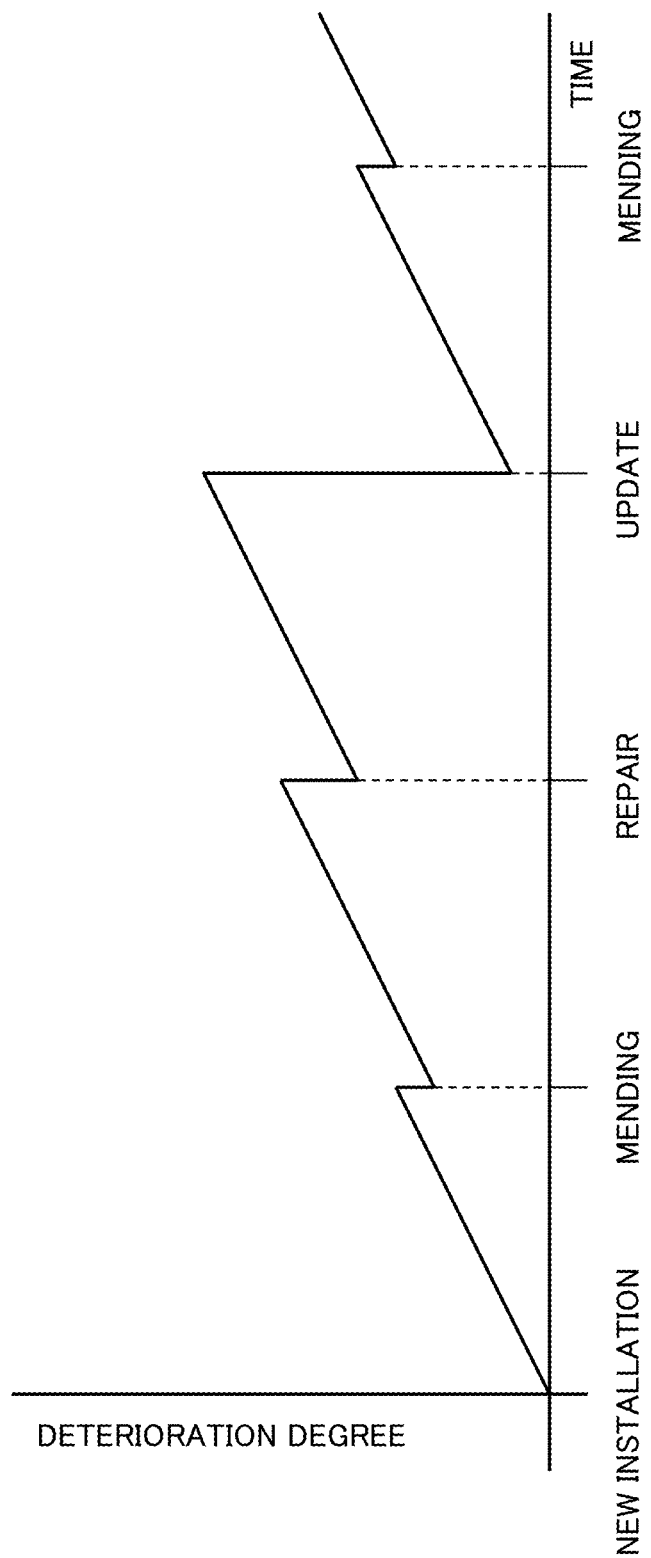

FIG. 14 is a diagram for explaining the deterioration degree related to repair or the like. In FIG. 14, the vertical axis represents deterioration degree, and the horizontal axis represents time.

In FIG. 14, the deterioration degree changes as follows.

First, at the time of new installation, the deterioration degree is the lowest. The deterioration degree increases according to the deterioration speed as time elapses.

However, when repair, mending, or update is performed, the deterioration degree is lowered. The deterioration progresses according to the deterioration speed from the deterioration degree that has been lowered by repair, mending, or update or the like.

Repair, mending, and update are performed for a plurality of times. Furthermore, repair and mending are performed more frequently than update. Therefore, in the following description, for convenience of explanation, processing for improving the deterioration degree such as new installation, repair, mending, or update are collectively referred to as "repair". For example, the deterioration degree immediately after a new installation, repair, mending, or update is collectively referred to as "deterioration degree after repair".

The deterioration degree increases according to the deterioration speed from the deterioration degree after repair. The deterioration degree after the repair that has been performed most recently is a deterioration degree serving as a reference in prediction of a future deterioration degree.

Therefore, the reference information may include the deterioration degree after the repair that has been performed most recently (hereinafter, referred to as "reference deterioration degree").

First Example Embodiment

Next, a first example embodiment will be described with reference to the drawings.

[Description of Configuration]

First, a configuration of a deterioration diagnosis device 100 according to a first example embodiment will be described with reference to the drawings.

FIG. 1 is a block diagram illustrating an example of a configuration of a deterioration diagnosis system 10 including the deterioration diagnosis device 100 according to the first example embodiment.

The deterioration diagnosis system 10 includes the deterioration diagnosis device 100, an imaging device 200, a reference information providing device 210, and a display device 300.

The imaging device 200 captures an image including a portion to be diagnosed in a structure (for example, a road surface, a sign, a ceiling, and/or a side wall).

The deterioration diagnosis system 10 can use any device as the imaging device 200 as long as the device can capture an image including a portion to be diagnosed. For example, the deterioration diagnosis system 10 may use a drive recorder installed for the purpose of recording the situation at the time of occurrence of an automobile accident as the imaging device 200. Alternatively, the deterioration diagnosis system 10 may use a camera (for example, an omnidirectional camera) that captures a scene as the imaging device 200.

Alternatively, the imaging device 200 may be an imaging device mounted on a vehicle used in an intelligent transport system (ITS) or the like. The ITS is a transportation system using information technology (IT).

FIG. 15 is a diagram illustrating an outline of ITS.

An information processing device 410 collects information from a vehicle 440 via a network 420 and/or a communication path 430. Then, the information processing device 410 controls a facility 450 installed on a road or the like based on the collected information and executes predetermined processing (for example, assistance of safe driving or management of roads). The facility 450 is optional. FIG. 15 illustrates a traffic light and an electronic toll collection system (ETC in FIG. 15) as an example of the facility 450.

Alternatively, the deterioration diagnosis system 10 may use a camera used for automatic driving as the imaging device 200. In this manner, the deterioration diagnosis system 10 may be used in an automatic driving system.

Hereafter the description will be given with reference back to FIG. 1.

Then, the imaging device 200 transmits the captured image to the deterioration diagnosis device 100 together with the capturing time.

The deterioration diagnosis device 100 may include the imaging device 200.

The reference information providing device 210 provides reference information to the deterioration diagnosis device 100.

The reference information providing device 210 is optional. For example, a device that manages repair may provide reference information to the deterioration diagnosis device 100. Alternatively, the deterioration diagnosis device 100 may acquire necessary reference information from a repair plan and a repair result report stored in a database (not illustrated) or the like. Alternatively, the user may operate a terminal device (not illustrated) or the like to transmit the reference information to the deterioration diagnosis device 100.

The reference information providing device 210 may be a single device or a system including a plurality of devices. Alternatively, the reference information providing device 210 is not limited to a specific device, and may be achieved using an information service implemented using computer resources connected via a predetermined network such as cloud computing.

The display device 300 receives an output (at least the calculated frequency) of the deterioration diagnosis device 100 to be described later, and displays the received frequency.

As the display device 300, the deterioration diagnosis system 10 can use any device as long as it can display the output of the deterioration diagnosis device 100. For example, the deterioration diagnosis system 10 may use, as the display device 300, a display device included in a system that manages repair and mending of a road. Alternatively, the deterioration diagnosis system 10 may use a display device (for example, a liquid crystal display of a terminal) of a terminal device carried by the user as the display device 300.

The deterioration diagnosis device 100 may include the display device 300. For example, the display device 300 may be a liquid crystal display, an organic electroluminescence display, or electronic paper.

Furthermore, the reference information providing device 210 and the display device 300 may be included in one device.

The deterioration diagnosis device 100 acquires an image from the imaging device 200. The deterioration diagnosis device 100 calculates the deterioration degree in the portion to be diagnosed included in the image. Then, the deterioration diagnosis device 100 stores the calculated deterioration degree as a history. Then, the deterioration diagnosis device 100 calculates the deterioration speed based on the history. Further, the deterioration diagnosis device 100 acquires the reference information from the reference information providing device 210. Then, the deterioration diagnosis device 100 calculates the inspection frequency for the portion based on the reference information and the deterioration speed. Then, the deterioration diagnosis device 100 transmits the calculated frequency to the display device 300.

Next, a configuration of the deterioration diagnosis device 100 will be described.

The deterioration diagnosis device 100 includes an image acquisition unit 110, a deterioration degree calculation unit 120, a deterioration information storage unit 130, a deterioration speed calculation unit 140, a reference information acquisition unit 150, a frequency calculation unit 160, and an output unit 170.

The image acquisition unit 110 acquires an image including a portion to be diagnosed in a structure (for example, a road surface of a road, or a side wall and a ceiling of a tunnel) and a capturing time of the image. The image acquisition unit 110 may acquire information (hereinafter, referred to as "location information") related to the location of the portion to be diagnosed. The location information is, for example, the latitude and longitude of the portion. The location information may include a direction of the portion.

The deterioration degree calculation unit 120 calculates the deterioration degree in the portion to be diagnosed by using a predetermined method.

A method used by the deterioration degree calculation unit 120 to calculate the deterioration degree is optional. For example, the deterioration degree calculation unit 120 calculates the area of the road surface and the area of the crack included in the image by using predetermined image recognition. Then, the deterioration degree calculation unit 120 calculates a crack rate of the road surface as the deterioration degree based on the calculated area of the road surface and the calculated area of the crack.

The deterioration degree calculation unit 120 may calculate the deterioration degree by using predetermined machine learning or artificial intelligence.

The deterioration degree calculation unit 120 may determine the type of deterioration (for example, cracking or rutting) included in the image by using predetermined image recognition, machine learning, or artificial intelligence, and calculate the deterioration degree in the determined deterioration. The image may include a capturing time and location information as the information.

The image may include a plurality of portions as diagnosis targets. In this case, the deterioration degree calculation unit 120 may calculate the deterioration degree for all the portions. Alternatively, the deterioration degree calculation unit 120 may calculate the deterioration degree for a portion selected according to a predetermined selection rule.

The deterioration degree calculation unit 120 uses the calculated deterioration degree and the capturing time to store the history of the deterioration degree associated with the portion in the deterioration information storage unit 130.

When there are a plurality of portions to be diagnosed, the deterioration degree calculation unit 120 stores a history associated with each portion in the deterioration information storage unit 130. For example, the deterioration degree calculation unit 120 may store the history of the deterioration degree at each location by using the location information of the portion to be diagnosed.

The acquisition source of the location information in the deterioration diagnosis device 100 is optional. For example, the image acquisition unit 110 may acquire the location information from the imaging device 200. Alternatively, a location calculation device (not illustrated) may calculate the location information by using the acquired image and map information in which the location and the image are associated with each other.

The deterioration information storage unit 130 stores a history of deterioration degree.

The deterioration speed calculation unit 140 calculates the deterioration speed by using the stored history.

In a case where there are a plurality of portions to be diagnosed, the deterioration speed calculation unit 140 calculates a deterioration speed for each of the portions.

The deterioration speed calculation unit 140 outputs the calculated deterioration speed to the frequency calculation unit 160.

The deterioration speed calculation unit 140 may store the calculated deterioration speed in the deterioration information storage unit 130 in association with the portion to be diagnosed. Alternatively, the deterioration speed calculation unit 140 may store the deterioration speed in a storage device (not illustrated). In these cases, the frequency calculation unit 160 uses the stored deterioration speed.

A method of calculating the deterioration speed in the deterioration speed calculation unit 140 is optional. For example, the deterioration speed calculation unit 140 may calculate the deterioration speed by applying predetermined regression analysis (for example, linear regression or quadratic curve regression) to the history.

The deterioration speed calculation unit 140 may use predetermined machine learning or artificial intelligence to calculate the deterioration speed.

The reference information acquisition unit 150 acquires reference information. The reference information acquisition unit 150 outputs the reference information to the frequency calculation unit 160.

The frequency calculation unit 160 calculates the inspection frequency by using the deterioration speed and the reference information.

A method of calculating the frequency in the frequency calculation unit 160 is optional.

Next, an example of calculating a frequency will be described.

Calculation Example 1

The deterioration diagnosis device 100 may determine the frequency in relation to the amount of change in the predetermined deterioration degree.

In this case, the reference information includes an amount of change (hereinafter referred to as "deterioration step") of the deterioration degree to be inspected.

In this case, the frequency calculation unit 160 can calculate the frequency based on the following equation.

Frequency=Deterioration step/Deterioration speed

For example, when the deterioration step is "0.1" and the deterioration speed is "0.01[/month]", the result is as follows.

Frequency=0.1/0.01=10

That is, the frequency is "10[months]". In this case, it is appropriate that the inspection person executes the inspection every ten months.

Calculation Example 2

The deterioration diagnosis device 100 may use the number of inspections to calculate the frequency.

In this case, the reference information includes a repair deterioration degree, a reference deterioration degree, and the number of inspections.

In this case, the frequency calculation unit 160 can calculate the frequency based on the following equation.

Frequency=(Repair deterioration degree−Reference deterioration degree)/Deterioration speed/Number of inspections For example, when the reference deterioration degree is "0.1", the repair deterioration degree is "0.7", the deterioration speed is "0.01 [/month]", and the number of inspections is "10", the result is as follows.

Frequency=(0.7−0.1)/0.01/10=6

That is, the frequency is "6[months]". In this case, it is appropriate that the inspection person executes the inspection every six months (half a year).

Then, the frequency calculation unit 160 outputs the calculated frequency to the output unit 170.

The frequency calculation unit 160 may correct the frequency with reference to the reliability of the deterioration degree. For example, when the reliability of the deterioration degree included in the history is lower than a predetermined threshold, the frequency calculation unit 160 may shorten the calculated frequency by a predetermined ratio.

The reliability in the deterioration degree is optional. Hereinafter, an example of the reliability used by the frequency calculation unit 160 will be described.

For example, the reliability may be a value associated with imaging information of an image used for calculating the deterioration degree.

For example, in a case where a weather condition is used as the imaging information, the reliability may be the following value.

Reliability in the case of fine weather=50%,
reliability in case of cloudy weather=100%,
reliability in case of rainy weather=0%.

Alternatively, the reliability may be calculated using a plurality of pieces of imaging information.

For example, the time zone around when the sun is in the culmination is a time zone that is not suitable for capturing an image used for deterioration diagnosis. In addition, from sunset to sunrise is a time zone that is not suitable for capturing an image used for deterioration diagnosis. That is, the image capturing time is one piece of image capturing information having a large influence on the reliability of the calculated deterioration degree.

In a case where the moving speed when the imaging device 200 captures an image is high, the image tends to be unclear. Alternatively, in a case where the vibration of the imaging device 200 is large (or, in a case where the change in acceleration is large), the image tends to be unclear due to blurring or the like.

Therefore, the following reliability may be used.

Reliability=Reliability of weather×Reliability of time zone×max(Reliability of rate and reliability of acceleration).

However, max( ) is a function that outputs the larger value in the parentheses. The reliability described above is the reliability calculated using the weather condition at the time of capturing the image, the image capturing time, and at least one of the moving speed and the acceleration of the imaging device that captures the image, as the capturing information for calculating the reliability.

Alternatively, the reliability may be calculated using predetermined machine learning or artificial intelligence.

Further, the reliability may be calculated to exclude an influence of a predetermined structure. For example, in a case where a predetermined structure (for example, a manhole and/or a road marking on a road surface) is included in the captured image, the reliability may be corrected to a value that reduces the influence of the structure.

Alternatively, in the calculation of the reliability, the imaging information to be used for the calculation may be selected based on an instruction from the user.

The frequency calculation unit 160 may calculate a frequency (hereinafter, referred to as "sectional frequency") associated with a section including a plurality of portions in addition to the frequency for a portion. For example, the frequency calculation unit 160 may calculate the sectional frequency associated with a section from one intersection to the next intersection.

A method of calculating the sectional frequency is optional. For example, the frequency calculation unit 160 may calculate, as the sectional frequency, an average value or a minimum value of frequencies for portions included in the section.

The output unit 170 outputs the calculated frequency.

The output unit 170 may output other information. For example, the output unit 170 may output the frequency and the location information of the portion.

Alternatively, the output unit 170 may output the sectional frequency in addition to the frequency associated with the portion. The output unit 170 may output location information of a portion included in the section together with the sectional frequency.

In outputting the information related to the selected portion, it is sufficient that the output unit 170 appropriately acquires the information from the configuration in which the information is stored or the configuration in which the information can be output. For example, when the location information is output, it is sufficient that the output unit 170 acquires the location information from the image acquisition unit 110 or the deterioration information storage unit 130.

[Description of Operations]

Next, operations of the deterioration diagnosis device 100 according to the first example embodiment will be described with reference to the drawings.

Figure 2:
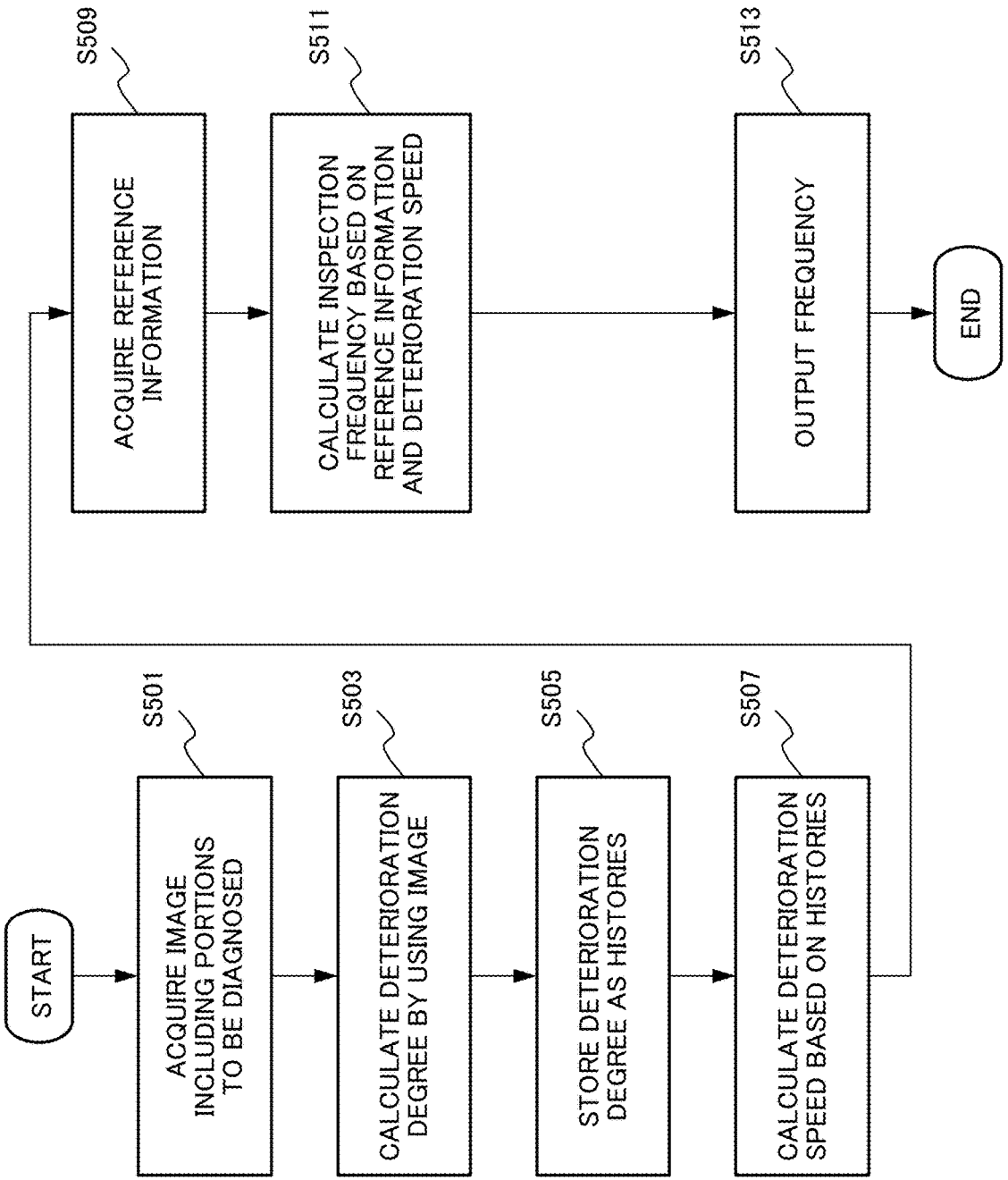
FIG. 2 is a flowchart illustrating an example of operations of the deterioration diagnosis device according to the first example embodiment.

FIG. 2 is a flowchart illustrating an example of the operations of the deterioration diagnosis device 100 according to the first example embodiment.

The image acquisition unit 110 acquires an image including portions to be diagnosed (step S501).

The deterioration degree calculation unit 120 calculates the deterioration degree by using the image (step S503).

The deterioration information storage unit 130 stores the deterioration degree as a history (step S505).

The deterioration speed calculation unit 140 calculates the deterioration speed based on the history (step S507).

The reference information acquisition unit 150 acquires reference information (step S509).

The frequency calculation unit 160 calculates the inspection frequency based on the deterioration speed and the reference information (step S511).

The output unit 170 outputs the calculated frequency (step S513).

Then, the deterioration diagnosis device 100 ends the operations.

Specific Examples

Next, the frequency calculated by the deterioration diagnosis device 100 will be described with reference to the drawings.

Figure 3:
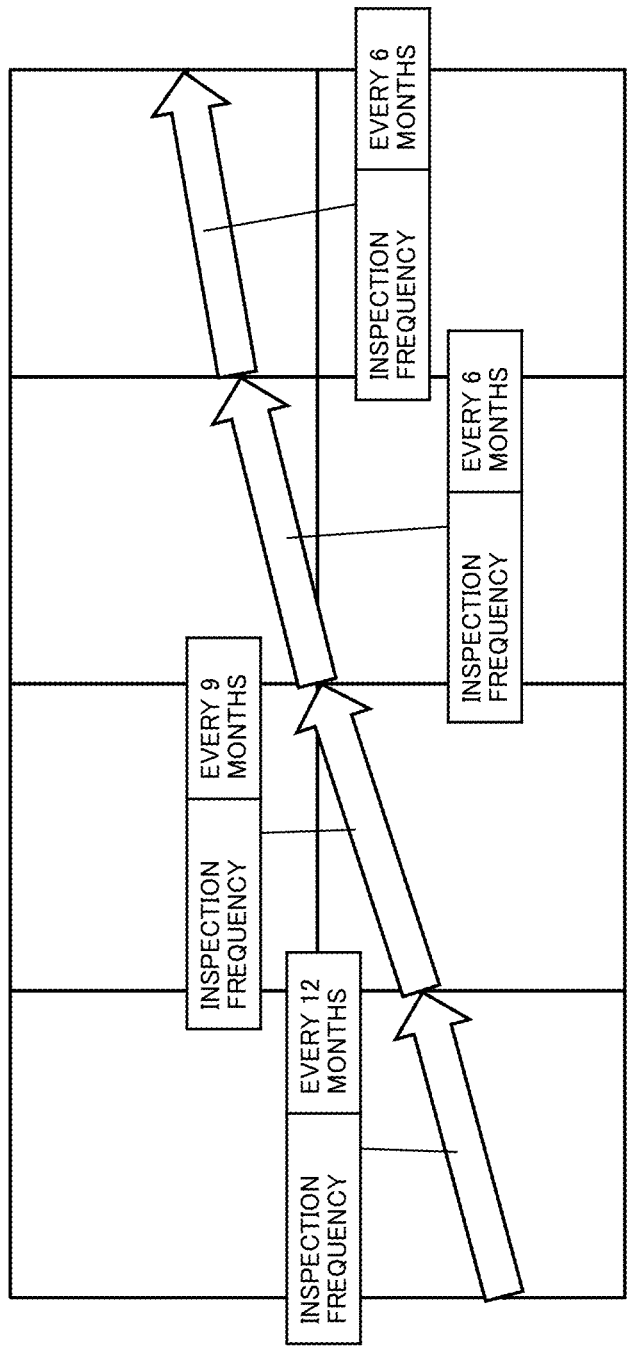
FIG. 3 is a diagram illustrating an example of display of each inspection frequency.

FIG. 3 is a diagram illustrating an example of display of inspection frequencies. FIG. 3 illustrates the inspection frequencies associated with four portions. In FIG. 3, arrows indicate the portions to be diagnosed.

As illustrated in FIG. 3, the deterioration diagnosis device 100 calculates the frequency for each portion to be diagnosed.

However, the frequency to be output by the deterioration diagnosis device 100 is not limited to the frequency calculated for the portion. For example, as described above, the deterioration diagnosis device 100 may output the frequency (sectional frequency) associated with the section including the plurality of portions.

Figure 4:
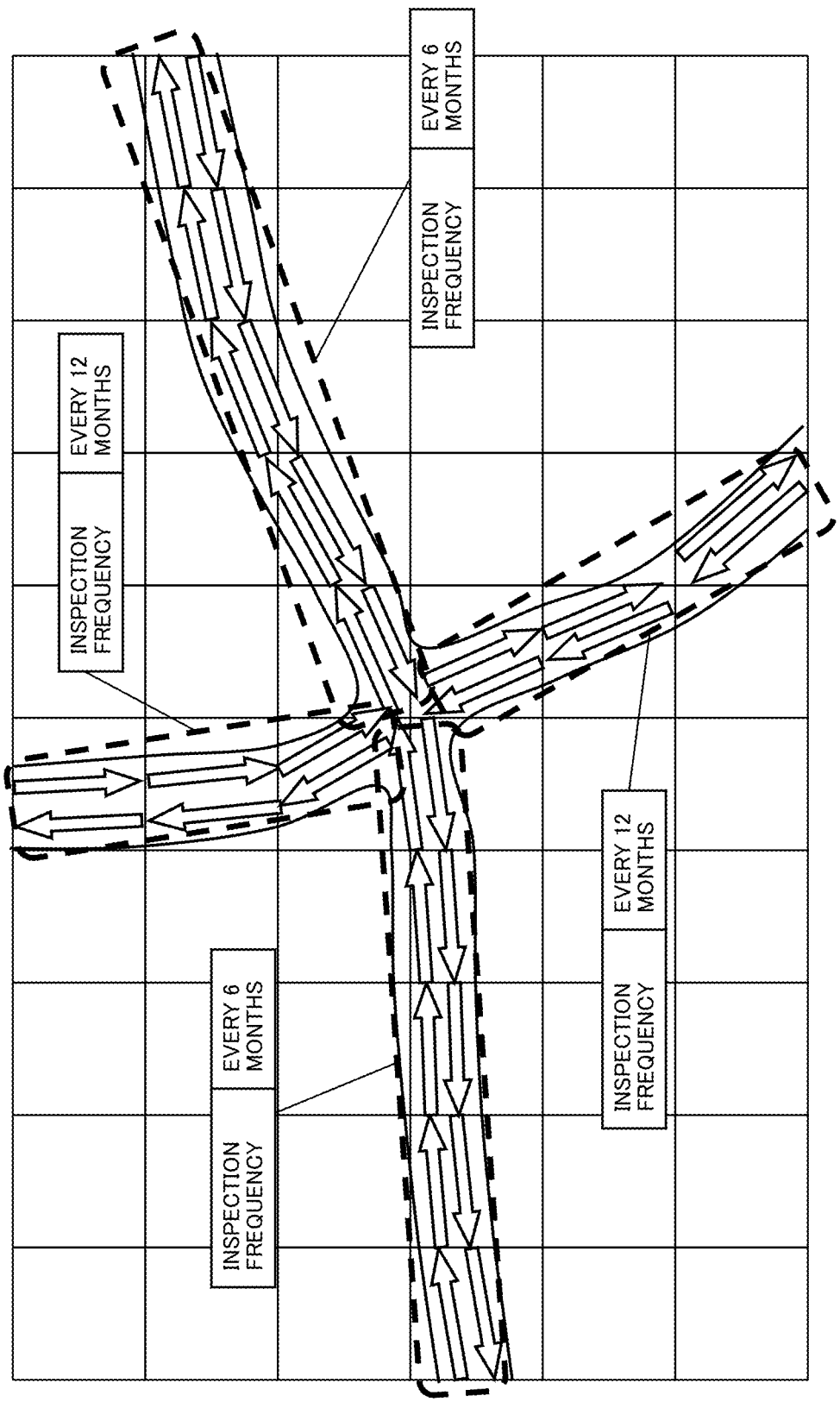
FIG. 4 is a diagram illustrating an example of display of each inspection frequency associated with a section including a plurality of portions.

FIG. 4 is a diagram illustrating an example of display of an inspection frequency associated with a section including a plurality of portions. FIG. 4 is an example of a case where a road is used as a diagnosis target.

In FIG. 4, each dashed square is a section including a plurality of portions.

Instead of the deterioration diagnosis device 100, the display device 300 may integrate the frequencies of the received portions and display the frequencies (sectional frequencies) associated with the section.

Description of Advantageous Effects

Next, advantageous effects of the deterioration diagnosis device 100 according to the first example embodiment will be described.

The deterioration diagnosis device 100 according to the first example embodiment can obtain the effect of providing an inspection frequency for a portion to be subjected to deterioration diagnosis.

The reason is as follows.

The deterioration diagnosis device 100 includes the deterioration information storage unit 130, the deterioration speed calculation unit 140, the reference information acquisition unit 150, the frequency calculation unit 160, and the output unit 170. The deterioration information storage unit 130 stores a history of deterioration degree in a portion to be diagnosed in a structure. The deterioration speed calculation unit 140 calculates the deterioration speed of the portion based on the history. The reference information acquisition unit 150 acquires reference information to be used to calculate the inspection frequency. The frequency calculation unit 160 calculates the inspection frequency for the portion based on the reference information and the deterioration speed. The output unit 170 outputs the calculated frequency.

The deterioration diagnosis device 100 calculates the inspection frequency based on the deterioration speed calculated based on the history of the deterioration degree and the reference information serving as a reference in the calculation of the inspection frequency, and outputs the calculated frequency.

Therefore, the user can grasp the inspection frequency.

The deterioration diagnosis device 100 further includes the image acquisition unit 110 and the deterioration degree calculation unit 120. The image acquisition unit 110 acquires an image including a portion to be diagnosed. The deterioration degree calculation unit 120 calculates the deterioration degree associated with the portion by using the image, and stores the calculated deterioration degree as a history in the deterioration information storage unit 130.

With these configurations, the deterioration diagnosis device 100 can store the history of the deterioration degree used to calculate the deterioration speed by using the image including the portion to be diagnosed.

In addition, the deterioration diagnosis system 10 includes the deterioration diagnosis device 100, the reference information providing device 210, and the display device 300. The reference information providing device 210 provides reference information to the deterioration diagnosis device 100. The deterioration diagnosis device 100 outputs the frequency based on the operations as described above. The display device 300 displays the frequency output from the deterioration diagnosis device 100.

Based on these configurations, the deterioration diagnosis system 10 can provide inspection frequencies to the user.

The deterioration diagnosis system 10 further includes the imaging device 200. The imaging device 200 captures an image including a portion of a structure to be diagnosed, and transmits the image to the deterioration diagnosis device 100. Based on such a configuration, the deterioration diagnosis system 10 can provide the inspection frequency for the portion of the structure included in the image by using the image captured by the imaging device 200.

In the present example embodiment, an example has been described in which the deterioration degree calculation unit 120 calculates the deterioration degree by using the image acquired from the imaging device 200. Instead of the imaging device 200, the deterioration degree calculation unit 120 may calculate the deterioration degree by using information acquired from an acceleration sensor (not illustrated). For example, the deterioration degree calculation unit 120 may calculate IRI as the deterioration degree according to a change in acceleration acquired from the acceleration sensor.

Further, the deterioration degree calculation unit 120 may calculate the deterioration degree by using both the image acquired from the imaging device 200 and the information acquired from the acceleration sensor.

[Hardware Configuration]

Next, a hardware configuration of the deterioration diagnosis device 100 will be described.

Each component of the deterioration diagnosis device 100 may be configured by a hardware circuit.

Alternatively, in the deterioration diagnosis device 100, each component may be configured using a plurality of devices connected via a network.

Alternatively, in the deterioration diagnosis device 100, the plurality of components may be configured by one piece of hardware.

Alternatively, the deterioration diagnosis device 100 may be achieved as a computer device including a central processing unit (CPU), a read only memory (ROM), and a random access memory (RAM). In addition to the above configuration, the deterioration diagnosis device 100 may be further achieved as a computer device including a network interface circuit (NIC). Furthermore, the deterioration diagnosis device 100 may be achieved as a computer device including a graphics processing unit (GPU) in order to speed up the deterioration diagnosis processing.

Figure 5:
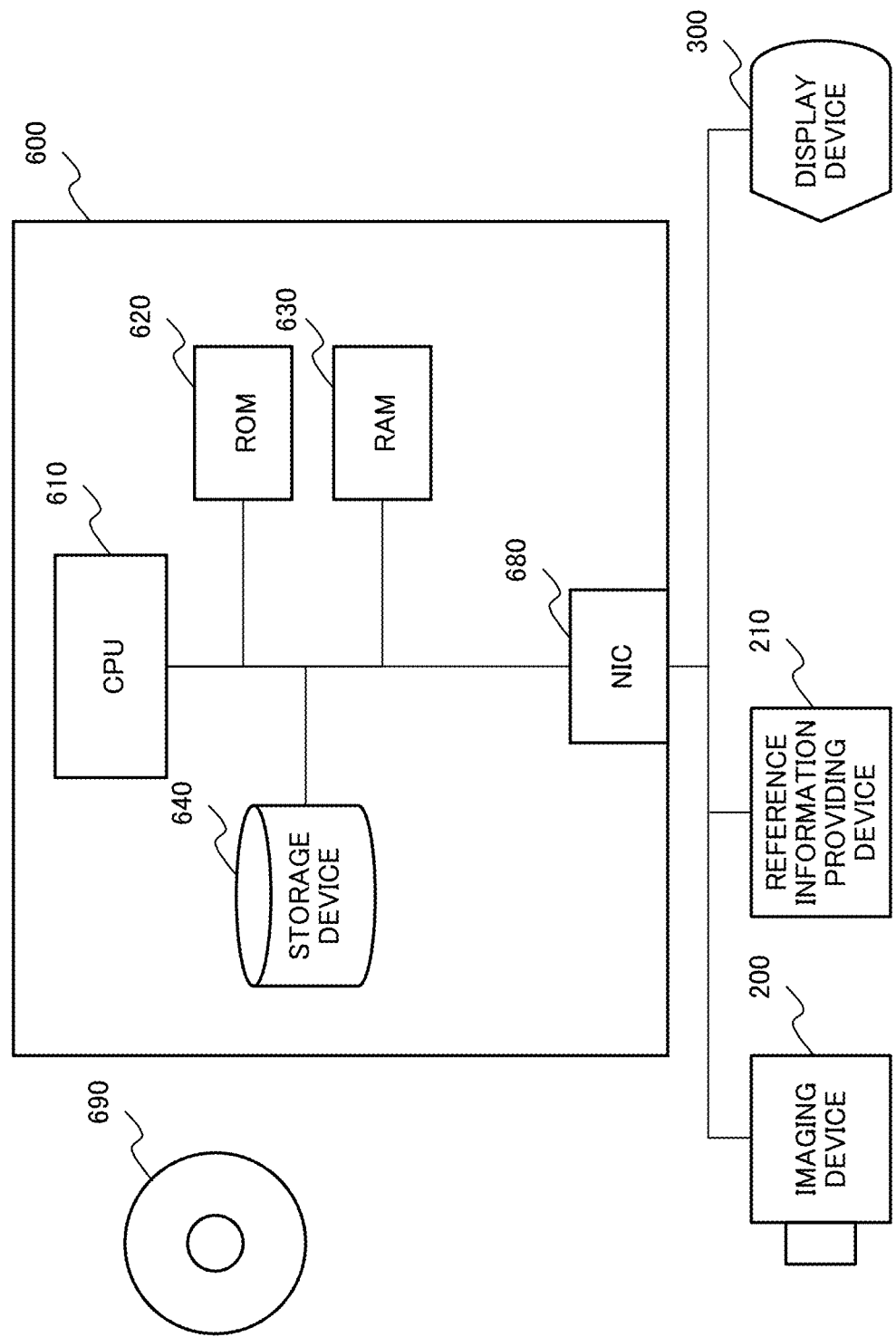
FIG. 5 is a block diagram illustrating an example of a hardware configuration of the deterioration diagnosis device.

FIG. 5 is a block diagram illustrating a configuration of an information processing device 600 as an example of a hardware configuration of the deterioration diagnosis device 100.

The information processing device 600 includes a CPU 610, a ROM 620, a RAM 630, a storage device 640, and a NIC 680 to constitute a computer device.

The CPU 610 reads a program from the ROM 620 and/or the storage device 640. Then, the CPU 610 controls the RAM 630, the storage device 640, and the NIC 680 based on the read program. Then, the computer device including the CPU 610 controls these configurations and achieves the functions as the configuration illustrated in FIG. 1. The configuration illustrated in FIG. 1 includes the image acquisition unit 110, the deterioration degree calculation unit 120, the deterioration information storage unit 130, the deterioration speed calculation unit 140, the reference information acquisition unit 150, the frequency calculation unit 160, and the output unit 170.

When achieving each function, the CPU 610 may use the RAM 630 or the storage device 640 as a temporary storage medium of the program.

In addition, the CPU 610 may read the program included in the storage medium 690 storing the program so as to be readable by the computer device by using a storage medium reading device (not illustrated). Alternatively, the CPU 610 may receive a program from an external device (not illustrated) via the NIC 680, store the program in the RAM 630 or the storage device 640, and operate based on the stored program.

The ROM 620 stores programs to be executed by the CPU 610 and fixed data. The ROM 620 is, for example, a programmable ROM (P-ROM) or a flash ROM.

The RAM 630 temporarily stores programs and data to be executed by the CPU 610. The RAM 630 is, for example, a dynamic-RAM (D-RAM).

The storage device 640 stores data and programs to be stored for a long period of time by the information processing device 600. The storage device 640 operates as the deterioration information storage unit 130. Furthermore, the storage device 640 may operate as a temporary storage device of the CPU 610. The storage device 640 is, for example, a hard disk device, a magneto-optical disk device, a solid state drive (SSD), or a disk array device.

The ROM 620 and the storage device 640 are non-volatile (non-transitory) storage media. On the other hand, the RAM 630 is a volatile (transitory) storage medium. The CPU 610 is operable based on a program stored in the ROM 620, the storage device 640, or the RAM 630. That is, the CPU 610 can operate using a nonvolatile storage medium or a volatile storage medium.

The NIC 680 mediates transmission and reception of data between the information processing device 600 and the imaging device 200, between the information processing device 600 and the display device 300, and between the information processing device 600 and the input device 310. The NIC 680 is, for example, a local area network (LAN) card. Furthermore, the NIC 680 is not limited to wired communication, and may be wireless communication.

The information processing device 600 configured as described above can obtain advantageous effects similar to those of the deterioration diagnosis device 100.

The reason is that the CPU 610 of the information processing device 600 can achieve the functions similar to that of the deterioration diagnosis device 100 based on the program.

Second Example Embodiment

As a second example embodiment, the outline of a deterioration diagnosis device 100 and the deterioration diagnosis system 10 according to the first example embodiment will be described.

[Description of Configuration]

Figure 6:
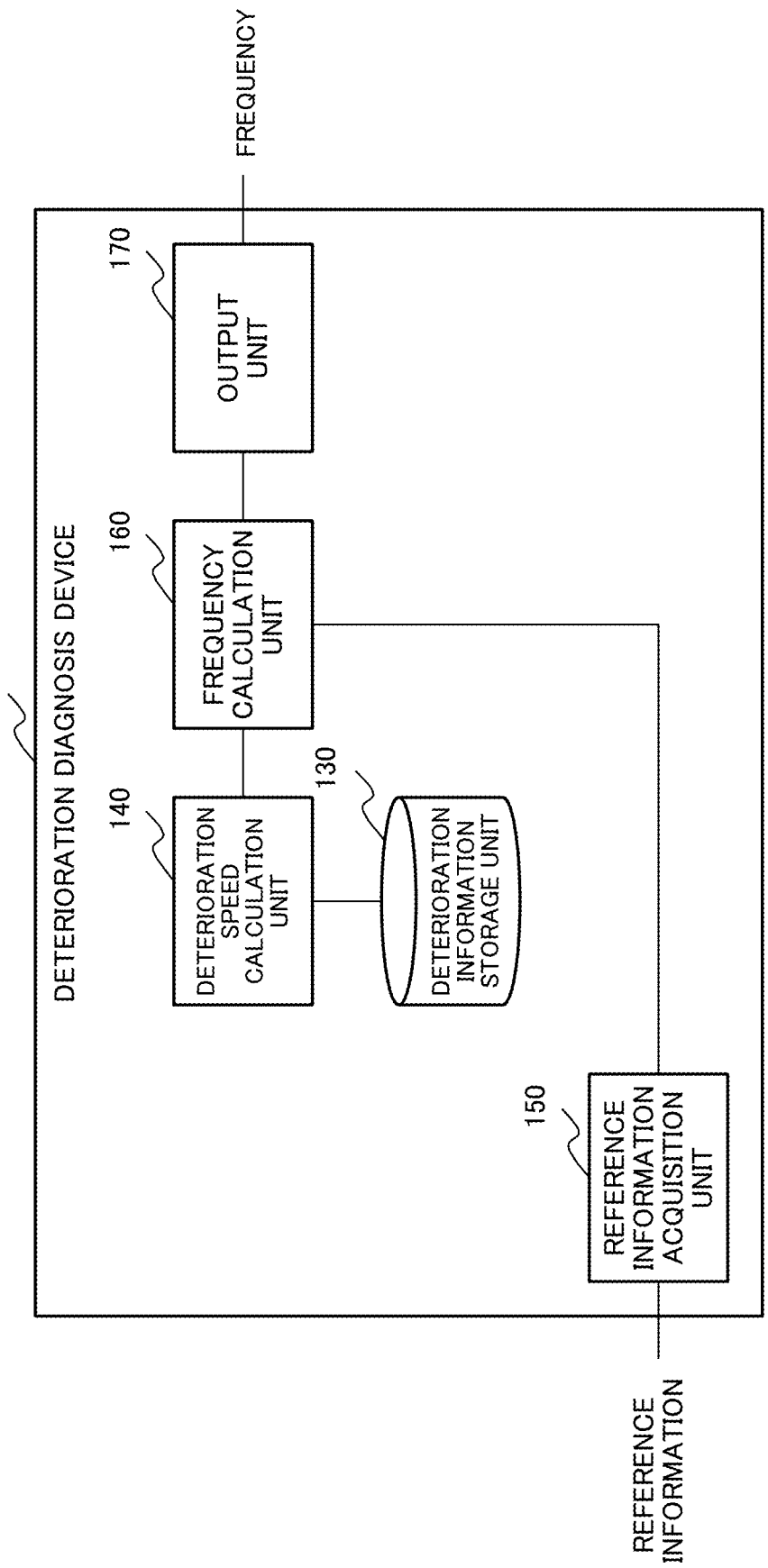
FIG. 6 is a block diagram illustrating an example of a configuration of a deterioration diagnosis device according to a second example embodiment.

FIG. 6 is a block diagram illustrating an example of a configuration of a deterioration diagnosis device 101 according to the second example embodiment, which is an outline of the deterioration diagnosis device 100 according to the first example embodiment.

The deterioration diagnosis device 101 includes a deterioration information storage unit 130, a deterioration speed calculation unit 140, a reference information acquisition unit 150, a frequency calculation unit 160, and an output unit 170. The deterioration information storage unit 130 stores a history of deterioration degree in a portion to be diagnosed in a structure. The deterioration speed calculation unit 140 calculates the deterioration speed of the portion based on the history. The reference information acquisition unit 150 acquires reference information to be used to calculate the inspection frequency. The frequency calculation unit 160 calculates the inspection frequency for the portion based on the reference information and the deterioration speed. The output unit 170 outputs the calculated frequency.

The deterioration diagnosis device 101 may be achieved using a computer device illustrated in FIG. 5.

[Description of Operations]

Figure 7:
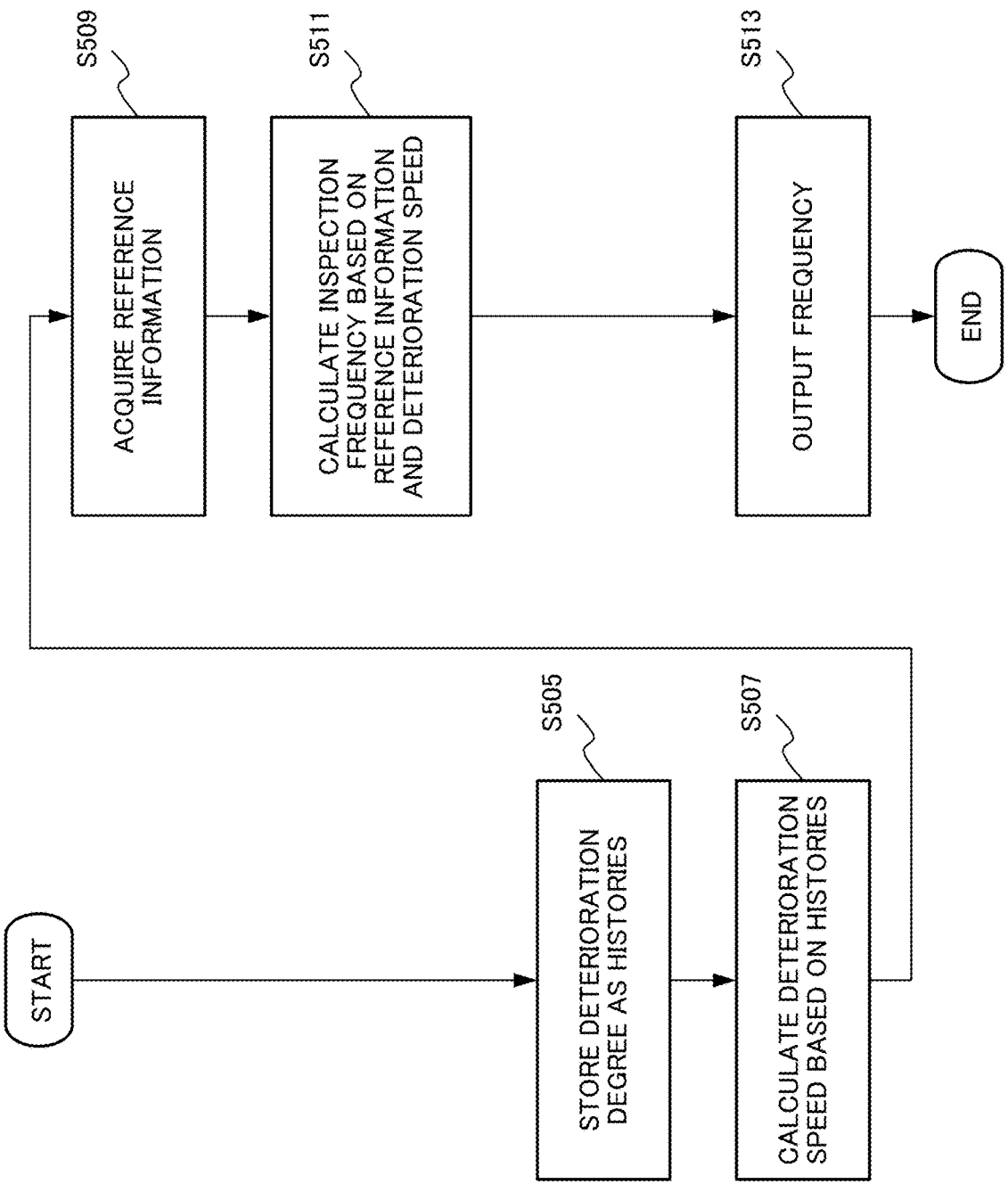
FIG. 7 is a flowchart illustrating an example of operations of the deterioration diagnosis device according to the second example embodiment.

FIG. 7 is a flowchart illustrating an example of the operations of the deterioration diagnosis device 101 according to the second example embodiment.

The deterioration information storage unit 130 stores the deterioration degree as a history (step S505).

The deterioration speed calculation unit 140 calculates the deterioration speed based on the history (step S507).

The reference information acquisition unit 150 acquires reference information (step S509).

The frequency calculation unit 160 calculates the inspection frequency based on the deterioration speed and the reference information (step S511).

The output unit 170 outputs the calculated frequency (step S513).

Then, the deterioration diagnosis device 101 ends the operations.

As described above, similarly to the deterioration diagnosis device 100, the deterioration diagnosis device 101 provides the inspection frequency for the deterioration diagnosis for the portion to be subjected to deterioration diagnosis.

Description of Advantageous Effects

As in the first example embodiment, the deterioration diagnosis device 101 can obtain the effect of providing the inspection frequency for deterioration diagnosis for the portion to be subjected to deterioration diagnosis.

This is because each configuration of the deterioration diagnosis device 101 operates similarly to the corresponding configuration in the deterioration diagnosis device 100.

The deterioration diagnosis device 101 in FIG. 6 is the minimum configuration of the deterioration diagnosis device 100 in the first example embodiment.

[Description of System]

Figure 8:
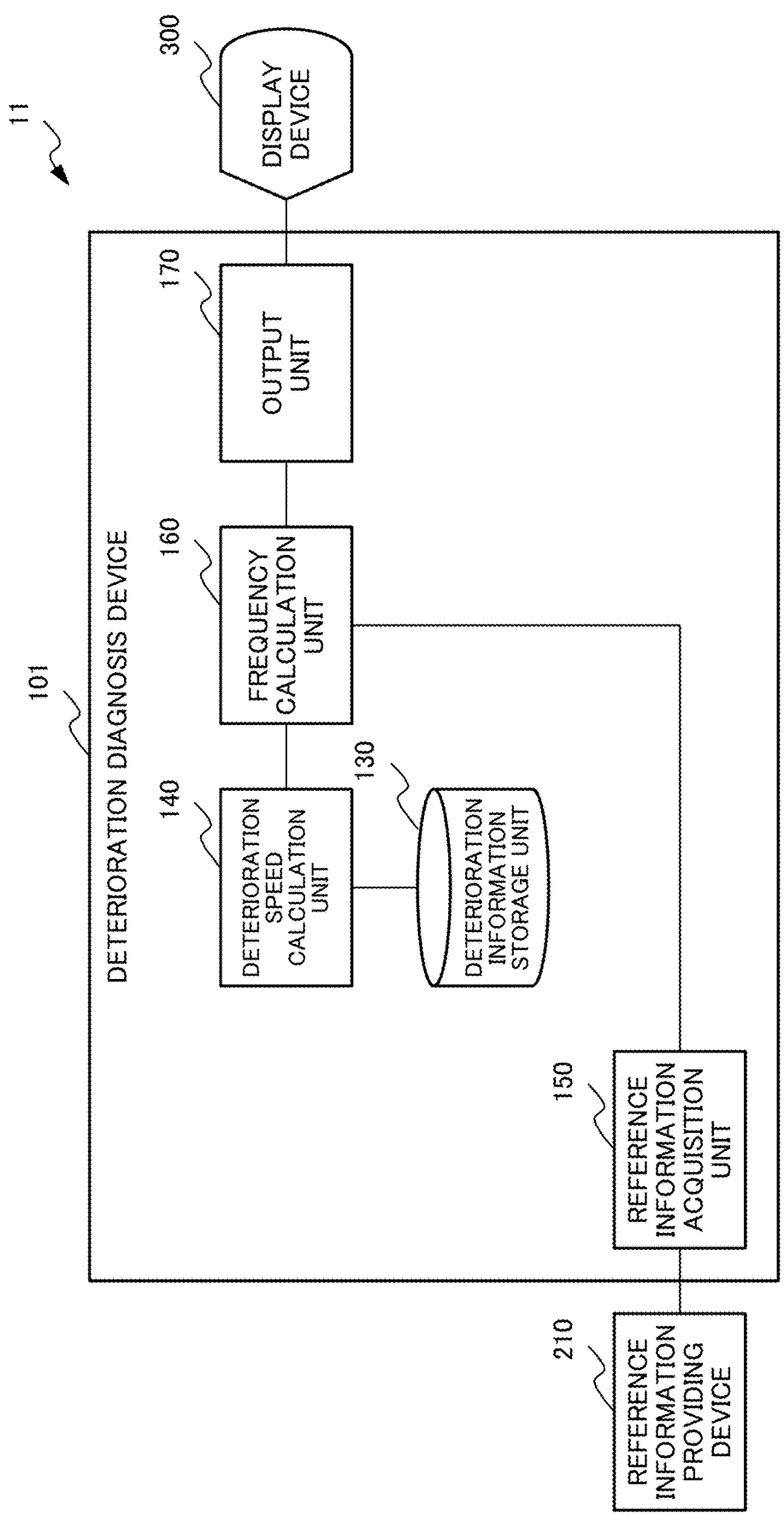
FIG. 8 is a block diagram illustrating an example of a configuration of a deterioration diagnosis system including the deterioration diagnosis device according to the second example embodiment.

FIG. 8 is a block diagram illustrating an example of a configuration of a deterioration diagnosis system 11 including the deterioration diagnosis device 101 according to the second example embodiment.

The deterioration diagnosis system 11 includes a deterioration diagnosis device 101, a reference information providing device 210, and a display device 300. The reference information providing device 210 provides reference information to the deterioration diagnosis device 100. The deterioration diagnosis device 100 outputs the frequency based on the operations as described above. The display device 300 displays the frequency output from the deterioration diagnosis device 100.

Based on such a configuration, the deterioration diagnosis system 11 can provide the inspection frequency to the user.

The deterioration diagnosis system 11 in FIG. 8 is the minimum configuration of the deterioration diagnosis system 10 in the first example embodiment.

Third Example Embodiment

A third example embodiment will be described with reference to the drawings.

[Description of Configuration]

Figure 9:
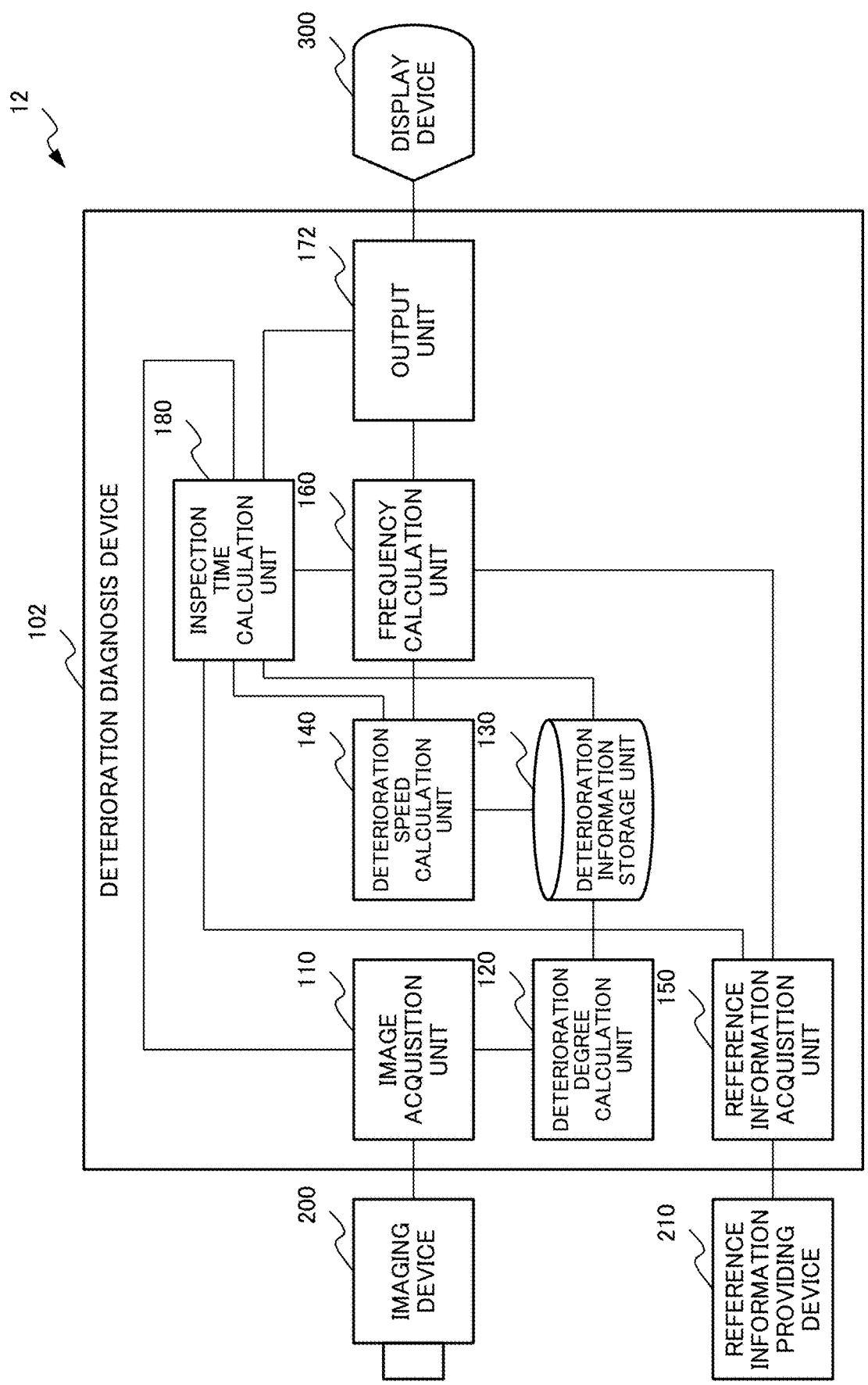
FIG. 9 is a block diagram illustrating an example of a configuration of a deterioration diagnosis system including a deterioration diagnosis device according to a third example embodiment.

FIG. 9 is a block diagram illustrating an example of a configuration of a deterioration diagnosis system 12 including a deterioration diagnosis device 102 according to the third example embodiment.

Since an imaging device 200, a reference information providing device 210, and a display device 300 are similar to those of the first example embodiment, detailed description of these will be omitted.

As compared with the deterioration diagnosis device 100, the deterioration diagnosis device 102 includes an output unit 172 instead of the output unit 170. The deterioration diagnosis device 102 further includes an inspection time calculation unit 180. Other configurations of the deterioration diagnosis device 102 are similar to those of the deterioration diagnosis device 100. Therefore, detailed description of the same configurations as those of the first example embodiment will be omitted. Hereinafter, configurations and operations unique to the third example embodiment will be described.

The deterioration diagnosis device 102 may be achieved using a computer device illustrated in FIG. 5.

The inspection time calculation unit 180 calculates the next inspection time.

The inspection time calculation unit 180 may use an optional method as the calculation of the next inspection time.

For example, the inspection time calculation unit 180 may calculate the next inspection time by using the following equation.

Next Inspection Time=Previous Inspection Time+ Inspection Frequency

In this case, the deterioration diagnosis device 100 acquires the reference information including the previous inspection time.

The progress of deterioration may occasionally change. For example, the traffic volume may temporarily increase due to the influence of road construction in other sections.

In addition, the image for calculating the deterioration degree is often continuously captured within a certain range. In such a case, the deterioration degree for the portion that has not reached the inspection time may be calculated together with the calculation of the deterioration degree for the other portion. As described above, the deterioration degree may be acquired during the period prior to the next inspection time.

When the deterioration degree is acquired during the period prior to the next inspection time, the inspection time calculation unit 180 may correct the next inspection time by using the acquired deterioration degree (hereinafter, referred to as "latest deterioration degree") and the capturing time (hereinafter, referred to as "latest capturing time") of the image used to calculate the deterioration degree. For example, the inspection time calculation unit 180 may recalculate the next inspection time by using the following equation.

Next Inspection Time=(Deterioration Step−(Latest Deterioration Degree−Deterioration Degree in Previous Inspection)/Deterioration Speed+Latest Capturing Time In this case, the inspection time calculation unit 180 may acquire the deterioration degree in the previous inspection from the history or the like. Further, it is sufficient that the inspection time calculation unit 180 acquires the deterioration step from the reference information. The inspection time calculation unit 180 may calculate the next inspection time for a section including a plurality of portions, similarly to the frequency calculation unit 160.

A method of calculating the next inspection time associated with the section including the plurality of portions is optional. For example, the inspection time calculation unit 180 may calculate an average value of the next inspection times of the portions included in the section or the next inspection time closest to the current time as the next inspection time associated with the section.

The output unit 172 outputs the next inspection time in addition to the same operations as in the first example embodiment.

[Description of Operations]

Next, operations of the deterioration diagnosis device 102 according to the third example embodiment will be described with reference to the drawings.

Figure 10:
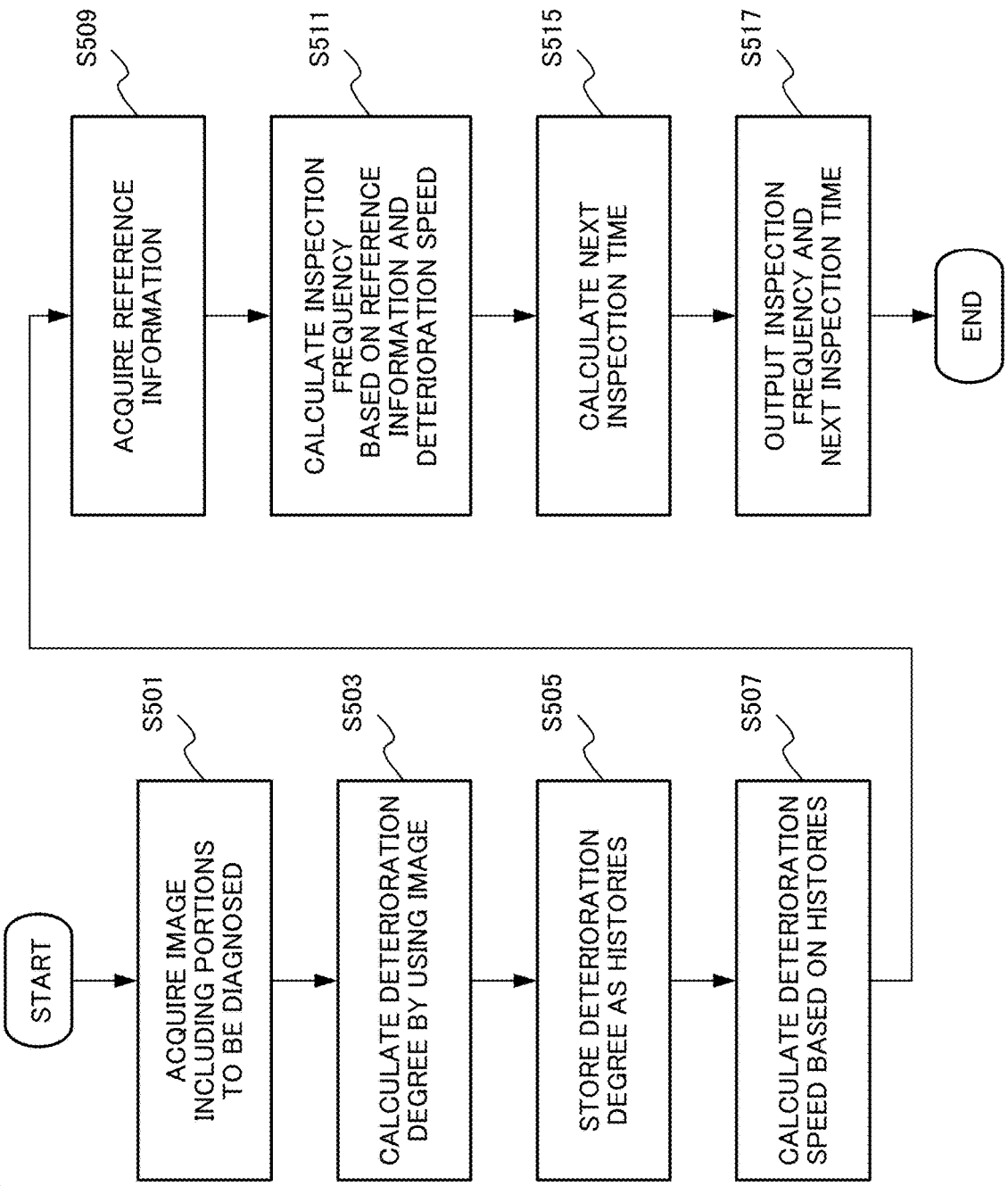
FIG. 10 is a flowchart illustrating an example of operations of the deterioration diagnosis device according to the third example embodiment.

FIG. 10 is a flowchart illustrating an example of the operations of the deterioration diagnosis device 102 according to the third example embodiment.

The image acquisition unit 110 acquires an image including portions to be diagnosed (step S501).

The deterioration degree calculation unit 120 calculates the deterioration degree by using the image (step S503).

The deterioration information storage unit 130 stores the deterioration degree as a history (step S505).

The deterioration speed calculation unit 140 calculates the deterioration speed based on the history (step S507).

The reference information acquisition unit 150 acquires reference information (step S509).

The frequency calculation unit 160 calculates the inspection frequency based on the deterioration speed and the reference information (step S511).

The inspection time calculation unit 180 calculates the next inspection time (step S115).

The output unit 172 outputs the frequency and the next inspection time (step S117).

Then, the deterioration diagnosis device 102 ends the operations.

Specific Examples

Secondly, next inspection times to be calculated by the deterioration diagnosis device 102 will be described with reference to the drawings.

Figure 11:
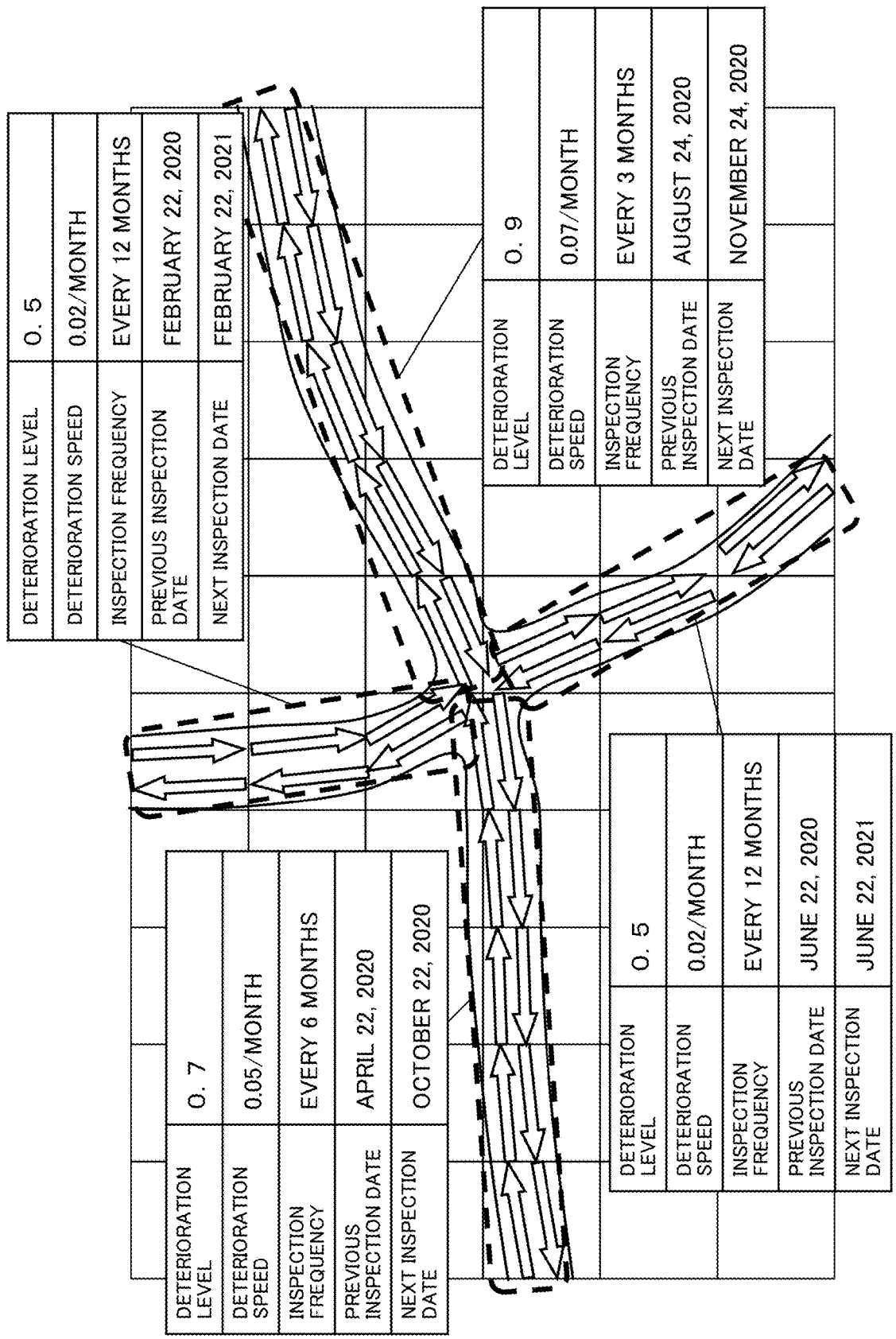
FIG. 11 is a diagram illustrating an example of display of next inspection times.

FIG. 11 is a diagram illustrating an example of display of the next inspection times ("next inspection date" in FIG. 11). FIG. 11 illustrates, as an example, the next inspection times for a section including a plurality of portions.

The deterioration diagnosis device 102 may output other information in addition to the next inspection times.

For example, FIG. 11 displays previous inspection times ("previous inspection date" in FIG. 11) in addition to the next inspection times.

The display device 300 may change the display associated with the portion in association with the next inspection time. For example, the display device 300 may display a portion in which the next inspection time is included in a predetermined range so as to be distinguishable from other portions. The predetermined range associated with the next inspection time is not limited to one, and may be plural.

Figure 12:
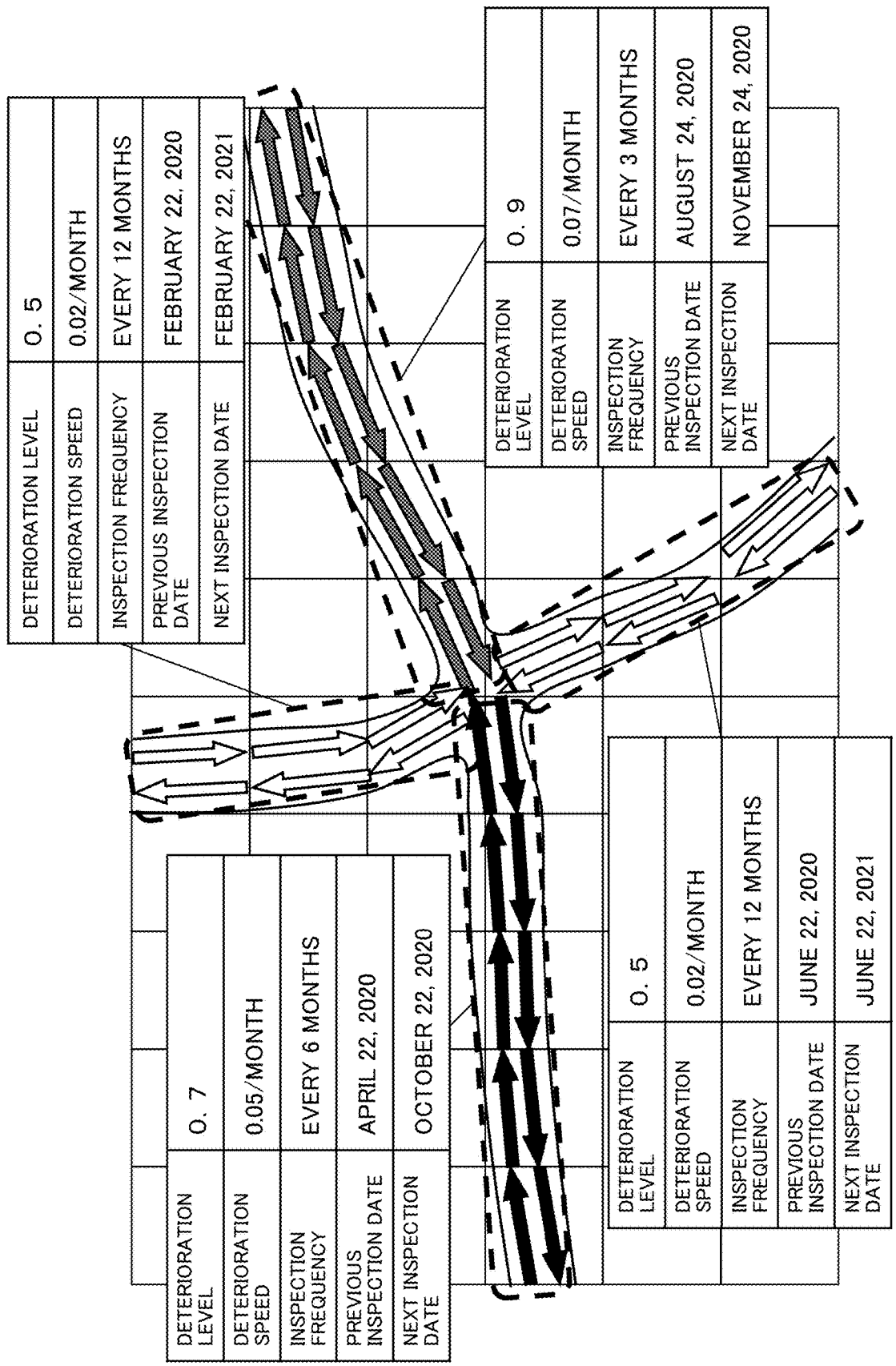
FIG. 12 is a diagram illustrating an example of display associated with next inspection times.

FIG. 12 is a diagram illustrating an example of display associated with next inspection times.

In FIG. 12, the display is changed for a portion in which a little time is left before the next inspection time. For example, the black arrows are the portions where next inspection times are coming closest. The gray arrows are portions where the next inspection time is coming later than the black arrows, but closer than the other arrows.

The user can grasp the portions where the next inspection time is closer based on such a display.

Furthermore, the deterioration diagnosis system 12 can provide information for planning a more efficient inspection to the user.

Figure 13:
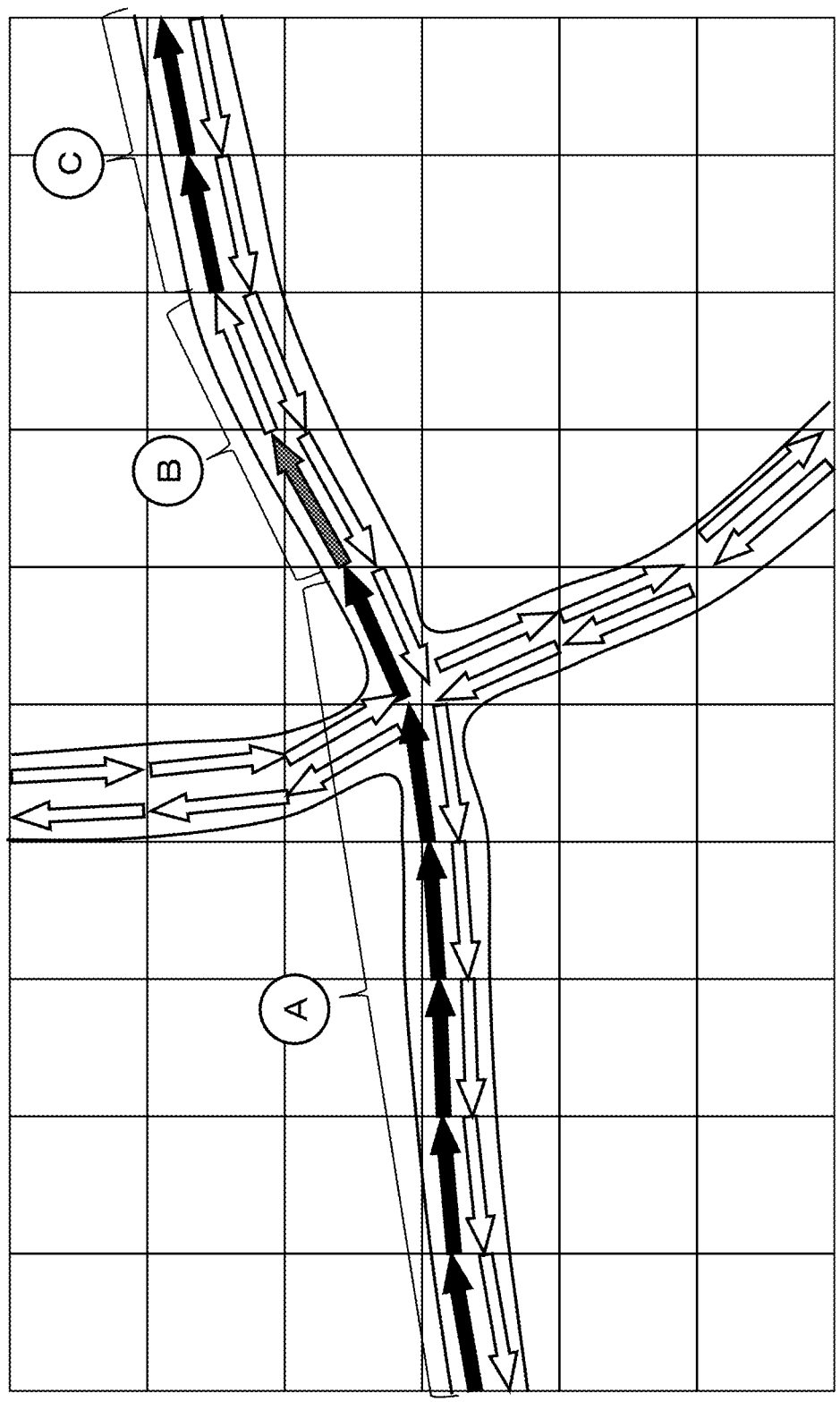
FIG. 13 is a diagram for explaining information provided by the deterioration diagnosis system.

FIG. 13 is a diagram for explaining information provided by the deterioration diagnosis system 12.

In FIG. 13, in portions indicated by rightward arrows included in the sections "A" and "C" (hereinafter referred to as "portions A and C"), the next inspection times are coming close. In the portions indicated by rightward arrows included in the section "B" (hereinafter, "portion B"), the next inspection time will be later than the "portions A and C". In the inspection simply using the inspection time, the inspection person inspects the "portions A and C" in the next inspection time, and inspects the "portion B" later.

However, the "portion B" is sandwiched between the "portions A and C". Therefore, the inspection person can continuously inspect the "portions A and C" and the "portion B".

For carrying out the inspections, indirect work is required such as moving to an inspection place, in addition to work of directly inspecting a portion to be diagnosed. When the inspection can be continuously performed as in the sections of "A, B, and C" illustrated in FIG. 13, it is more efficient to continuously perform the inspection. In particular, when the "portion B" is shorter than the "portions A and C", the continuous inspection is more efficient than when the inspection is performed separately.

The user of the deterioration diagnosis system 12 can grasp, by referring to the display of the display device 300 in the deterioration diagnosis system 12 illustrated in FIG. 13, the portions and sections that can be efficiently inspected by continuous inspection although their next inspection times are different.

In this manner, the deterioration diagnosis system 12 can display the remaining period until the next inspection time for the plurality of portions and sections in association with each location of the portions and the sections. Therefore, the user of the deterioration diagnosis system 12 can perform an efficient inspection in consideration of the location of the portion or the like, not only by the inspection with reference to the next inspection time.

The deterioration diagnosis device 102 or the display device 300 may select "portions and sections that are desirably inspected together" as described above with reference to a predetermined rule.

As a rule in the case of FIG. 13, "portions (portions B) within a predetermined number sandwiched between portions or sections (portions A and C) whose time period until the next inspection time is within a predetermined time" is assumed.

Alternatively, when deterioration progresses slowly with respect to the inspection frequency, even if the inspection time is changed within a certain range, the inspection result is hardly affected. Continuous inspection is efficient for portions that are continuous in terms of location. Therefore, the deterioration diagnosis device 102 or the display device 300 may select "the portions and the sections that are desirably inspected together" by using the rule of "the continuous portions and the sections in which the next inspection times are included within the predetermined range".

Alternatively, the deterioration diagnosis device 102 or the display device 300 may select "portions and sections that are desirably inspected together" by using predetermined machine learning or artificial intelligence.

Description of Advantageous Effects

Advantageous effects of the third example embodiment will be described.

The deterioration diagnosis device 102 according to the third example embodiment can obtain the effect of outputting the next inspection time in addition to the advantageous effects of the first example embodiment.

The reason is as follows.

The deterioration diagnosis device 102 includes an output unit 172 instead of the output unit 170 in the deterioration diagnosis device 100. The deterioration diagnosis device 102 further includes an inspection time calculation unit 180. The inspection time calculation unit 180 calculates the next inspection time. Then, the output unit 172 outputs the frequency and the next inspection time.

With such a configuration, the deterioration diagnosis device 102 outputs the next inspection time in addition to the frequency.

The display device 300 displays the next inspection time output from the deterioration diagnosis device 102. Therefore, the user can easily grasp the next inspection time.

Modified Examples

The image acquisition unit 110 in the deterioration diagnosis device 102 may control the acquisition of an image during the period until the next inspection time.

For example, it is unnecessary to acquire an image for diagnosing the deterioration degree before the next inspection time or a predetermined time before the next inspection time (in the following description, they are collectively referred to as "next inspection time").

Therefore, the image acquisition unit 110 may request operations related to an image in the imaging device 200 or a change of an image to be captured before the next inspection time.

For example, the image acquisition unit 110 may request the imaging device 200 to stop capturing an image or transmitting an image before the next inspection time.

The image acquisition unit 110 may request a device (not illustrated) forming a communication path with the imaging device 200 to stop transmission of an image from the imaging device 200, instead of requesting the imaging device 200. Alternatively, the image acquisition unit 110 may stop the acquisition of an image.

Alternatively, the image acquisition unit 110 may request the imaging device 200 to change a data format of an image to be captured (for example, the number of pixels and/or the frame rate of the image).

That is, the deterioration diagnosis device 102 may control the operations in the imaging device 200 based on the next inspection time.

Based on such operations, the deterioration diagnosis system 12 can reduce a processing load in the imaging device 200 and/or a communication load between the imaging device 200 and the deterioration diagnosis device 102.

While the invention has been particularly shown and described with reference to example embodiments, the present invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention can be applied to a traffic system using information technology (IT) such as an intelligent transport system (ITS).

This application is based upon and claims the benefit of priority from Japanese patent application No. 2020-062915, filed on Mar. 31, 2020, the disclosure of which is incorporated herein in its entirety by reference.

REFERENCE SIGNS LIST 10 deterioration diagnosis system
11 deterioration diagnosis system
12 deterioration diagnosis system
100 deterioration diagnosis device
101 deterioration diagnosis device
102 deterioration diagnosis device
110 image acquisition unit
120 deterioration degree calculation unit
130 deterioration information storage unit
140 deterioration speed calculation unit
150 reference information acquisition unit
160 frequency calculation unit
170 output unit
180 inspection time calculation unit
200 imaging device
210 reference information providing device
300 display device
410 information processing device
420 network
430 communication path
440 vehicle
450 facility
600 information processing device
610 CPU
620 ROM
630 RAM
640 storage device
680 NIC
690 storage medium

What is claimed is:

1. A deterioration diagnosis device comprising:
   a memory storing instructions; and
   at least one processor coupled to the memory and configured to execute the instructions to perform operations comprising:
   storing a history of deterioration degree in a portion to be diagnosed in a structure;
   calculating a deterioration speed of the portion based on the history;
   calculating the inspection frequency for the portion based on a reference information and the deterioration speed;
   outputting the calculated inspection frequency on a map with the information related to a location of the portion; and
   automatically controlling an imaging device based on the calculated inspection frequency.

2. The deterioration diagnosis device according to claim 1, wherein the operations further comprise:
   outputting the frequency and information related to a location of the portion.

3. The deterioration diagnosis device according to claim 1, wherein the operations further comprise:
   calculating a next inspection time based on the reference information; and
   outputting a next inspection time.

4. The deterioration diagnosis device according to claim 1, wherein the operations further comprise:
   acquiring an image including the portion to be diagnosed; and
   calculating the deterioration degree associated with the portion by using the image and store the calculated deterioration degree as the history.

5. The deterioration diagnosis device according to claim 4, wherein the operations further comprise:
   controlling acquisition of an image or changes a format of an image based on a next inspection time.

6. The deterioration diagnosis device according to claim 1, wherein the operations further comprise:
   acquiring a reference information to be used to calculate an inspection frequency, wherein
   the calculating the inspection frequency for the portion is based on the reference information and the deterioration speed.

7. The deterioration diagnosis device according to claim 6, wherein the reference information is information determined according to a method of calculating the inspection frequency.

8. The deterioration diagnosis device according to claim 6, wherein
the reference information includes information indicating at least one of an amount of change in the deterioration degree, the number of inspections, information to be used to calculate the next inspection time or deterioration degree.

9. A deterioration diagnosis method performed by a computer and comprising:
storing a history of deterioration degree in a portion to be diagnosed in a structure;
calculating a deterioration speed of the portion based on the history;
calculating the inspection frequency for the portion based on a reference information and the deterioration speed;
outputting the calculated inspection frequency on a map with the information related to a location of the portion; and
automatically controlling an imaging device based on the calculated inspection frequency.

10. A non-transitory computer-readable recording medium storing a program executable by a computer to perform a method comprising:
storing a history of deterioration degree in a portion to be diagnosed in a structure;
calculating a deterioration speed of the portion based on the history;
calculating the inspection frequency for the portion based on a reference information and the deterioration speed;
outputting the calculated inspection frequency on a map with the information related to a location of the portion; and
automatically controlling an imaging device based on the calculated inspection frequency.

* * * * *